(12) United States Patent
Sandow et al.

(10) Patent No.: US 11,676,207 B2
(45) Date of Patent: *Jun. 13, 2023

(54) FLEXIBLE PRICE-VOLUME INDICATOR

(71) Applicant: TRADING TECHNOLOGIES INTERNATIONAL INC., Chicago, IL (US)

(72) Inventors: Stefani Sandow, Chicago, IL (US); Patrick Joseph Rooney, St. Charles, IL (US); Scott F. Singer, Green Oaks, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/241,925

(22) Filed: Apr. 27, 2021

(65) Prior Publication Data

US 2021/0248678 A1    Aug. 12, 2021

Related U.S. Application Data

(63) Continuation of application No. 16/052,156, filed on Aug. 1, 2018, now Pat. No. 11,037,242, which is a continuation of application No. 14/588,154, filed on Dec. 31, 2014, now Pat. No. 10,068,292.

(51) Int. Cl.
   *G06Q 40/04* (2012.01)
(52) U.S. Cl.
   CPC .................................. *G06Q 40/04* (2013.01)
(58) Field of Classification Search
   None
   See application file for complete search history.

(56) References Cited

U.S. PATENT DOCUMENTS

| | | | |
|---|---|---|---|
| 7,366,691 B1 | 4/2008 | Kemp, II et al. | |
| 7,389,268 B1 | 6/2008 | Kemp, II et al. | |
| 7,558,754 B1* | 7/2009 | Singer .................... | G06Q 40/04 705/37 |
| 7,565,317 B1 | 7/2009 | West et al. | |
| 7,689,499 B1 | 3/2010 | Duquette | |
| 7,813,994 B1 | 10/2010 | Ebersole et al. | |
| 10,068,292 B2 | 9/2018 | Sandow et al. | |
| 2010/0017259 A1* | 1/2010 | Luo ........................ | G06Q 30/02 705/400 |
| 2015/0039488 A1 | 2/2015 | Rooney | |
| 2016/0189296 A1 | 6/2016 | Sandow et al. | |
| 2018/0342012 A1 | 11/2018 | Sandow et al. | |

* cited by examiner

*Primary Examiner* — Namrata Boveja
*Assistant Examiner* — Liz P Nguyen
(74) *Attorney, Agent, or Firm* — McDonnell Boehnen Hulbert & Berghoff LLP

(57) ABSTRACT

Example methods, apparatus, and computer readable storage media are described and disclosed. An example method includes receiving, by a computing device, market data related to a tradeable object. The example method includes displaying, by the computing device, a flexible price-volume indicator, the flexible price-volume indicators aligned with a specific value level in a value axis. The example method includes updating, by the computing device, a display property associated with the flexible price-volume indicator, the display property reflecting a quantity value determined based on the received market data. The example method includes displaying, by the computing device, the flexible price-volume indicator in a differentiated state based on a change in the market data.

16 Claims, 13 Drawing Sheets

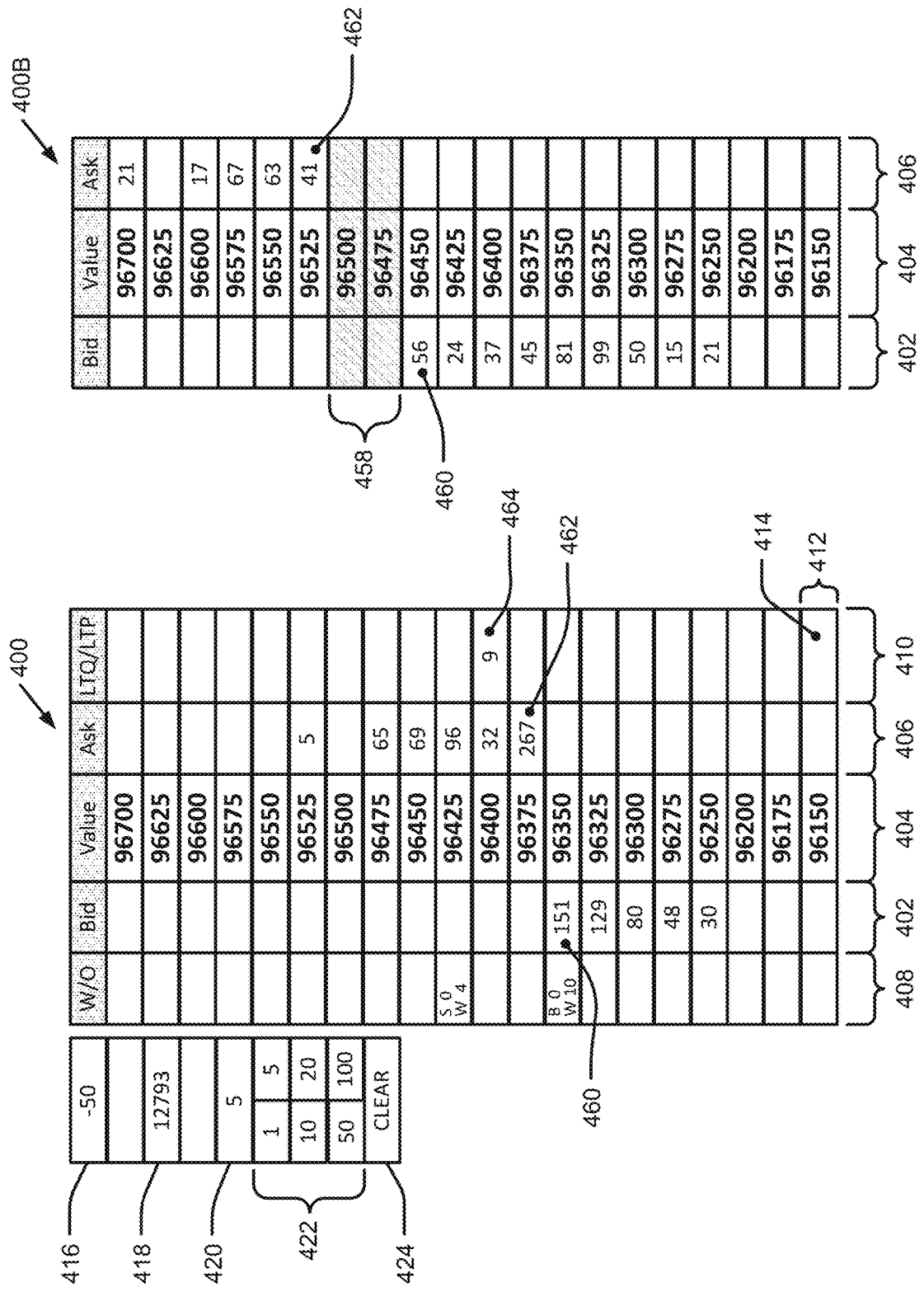

US 11,676,207 B2

FLEXIBLE PRICE-VOLUME INDICATOR

CROSS REFERENCE TO RELATED APPLICATIONS

The present application is a continuation of U.S. patent application Ser. No. 16/052,156, filed Aug. 1, 2018, now U.S. Pat. No. 11,037,242, which is a continuation of U.S. patent application Ser. No. 14/588,154, filed Dec. 31, 2014, now U.S. Pat. No. 10,068,292, the entire contents of each of which are incorporated herein by reference for all purposes.

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

The trading device may provide a trading interface to enable a user to monitor the information about the market and execute trades via the electronic exchange. Some trading interfaces list prices, bid quantities and/or ask quantities of a tradeable object to enable the user to determine a market depth of the tradeable object.

BRIEF DESCRIPTION OF THE FIGURES

Certain embodiments are disclosed with reference to the following drawings.

FIGS. 4A to 4E illustrate block diagrams representative of example trading interfaces in which certain embodiments may be employed.

Figure 1:
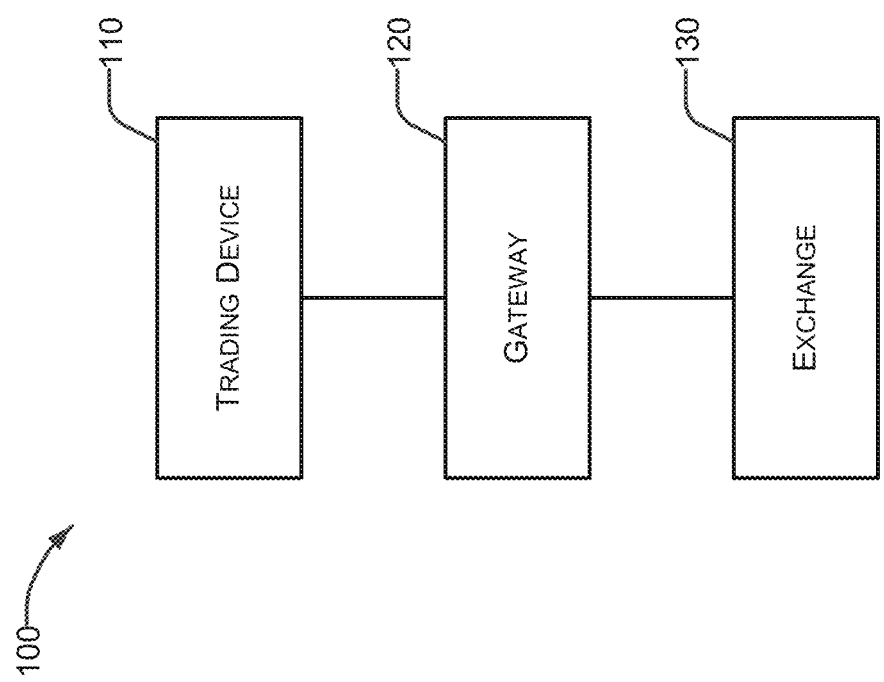
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

This disclosure relates generally to electronic trading environments and, more particularly, to indicating market information using a graphical indicator.

Trading devices are often utilized by a trader or other market participant to monitor trading activity in a market for a tradeable object, execute trades of the tradeable object and/or perform other actions in cooperation with an electronic exchange. The electronic exchange communicates market data to the trading device, and the trading device stores, organizes, analyzes and/or displays the market data. As the tradeable object is traded in the market, the price at which the trading activity in the tradeable object occurs may move (e.g., increase, decrease, fluctuate, etc.). The ability to determine when and by how much the volume of trades in the tradeable object is changing as the price moves may influence a user's decision to execute a trade (e.g., go short, go long, etc.) or conduct other market activity or strategy.

The examples disclosed and described herein enable a user to better understand a relationship between movement of price and volume of trades of a tradeable object using one or more graphical indicators. The example graphical indicators disclosed herein illustrate time-based trends between the price at which trading activity occurs and the volume of the trades in the tradeable object. For example, the graphical indicators may visually indicate a direction of change of the price and a level of volume of trades of the tradeable object over a window of time or a price range. In some examples, the graphical indicators are generated on trading interfaces adjacent to a price axis, which enable the user to monitor and detect changes in the market data, detect trends between the price and the volume based on an appearance of the graphical indicator, and execute trades of the tradeable object. The example trading device disclosed herein updates the graphical indicator based on the market data communicated by the electronic exchange to enable the graphical indicator to indicate the trend on a rolling or up-to-date basis. In certain examples, alphanumeric text provided in addition to the graphical indicator conveys information regarding a parameter (e.g., volume such as absolute volume, relative volume, presence of volume, etc.) associated with the graphical indicator and the tradeable object.

A volume can be defined as an amount of a tradeable object that was traded during a certain period of time. For example, a volume can show a number of units or shares of a tradeable object that were traded in an eight hour period. This volume can also be referred to as an absolute volume or an actual volume. A relative volume represents a ratio of an actual volume for a tradeable object to normal volume for the tradeable object in the same time period (e.g., the same time of day). For example, a relative volume for a tradeable object can be calculated by taking the actual volume up to a specific time of day and dividing the actual volume by a given time period, such as the past ten or twenty days.

Additionally, a volume at price (VAP) calculates the volume traded at each price level during a defined period of time. Using VAP, price levels of interest may be selected or otherwise highlighted to allow a user to identify price points at which the tradeable object can be considered a value, overvalued, or undervalued, for example. A VAP indicator can use volume activity at a price from a prior session and can be shown in conjunction with information provided in a current trading session. In certain examples, a VAP indicator can also be configured to display this information in real time as new information enters the market. Providing a VAP indicator can help traders understand how the market might respond to a certain price level based on how price reacted to that level in the past, for example.

VAP information can include one or more aspects including a Volume Point of Control (VPOC). The VPOC level represents a price at which the largest volume was traded during the specified prior period of time. Thus, the VPOC may represent the "fairest" price for the tradeable object based on volume. Additionally, VAP information can include volume peaks or High Volume Areas (HVAs). The volume peaks identify high traffic price levels at which most trading activity took place between buyers and sellers. Low Volume Areas (LVAs) often separate the peaks or HVAs and can be an indicator of a next HVA.

Thus, using VAP, a trading interface can provide a visualization of a historical cumulative volume at one or more specified price levels. Cumulative volume at price shows the total volume that has traded at each price for a particular time frame, such as day, week, month, etc. By comparing the cumulative volume at price in a plurality of different time frames, volume distribution for a tradeable object can be confirmed. VAP can be viewed in real time (or substantially in real time accounting for a processing, storage, and/or transmission delay), reviewed with respect to historical data, etc. Using a VAP indicator with respect to price via a trading interface allows the trading interface to provide an indication of strength or weakness at a certain volume in the market (e.g., prices that attract high volume, prices that attract low volume, etc.).

A VAP indicator allows a trader and/or trading algorithm to evaluate a probability of a next change in volume at a given price. For example, given a high volume at a certain price for a given timeframe (e.g., day, week, month, etc.), it is probable that a high volume will be generated again when the price for the tradeable object reaches the same price level.

A more detailed VAP provides additional, finite information to give traders a quick view of trade activity at specific price levels. For example, systems and methods disclosed and described herein visualize changes in volume with respect to a value axis (e.g., a flexible price-volume indicator). For example, a flexible price-volume indicator can be implemented as a single indicator to reflect a presence of volume at a specific volume level, and/or as a series of indicators to reflect an absolute volume at a specific volume level and/or a relative volume at a specific volume level.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

Additionally, while some examples described herein may refer to functions performed by one or more given actors such as "users" and/or other entities, it should be understood that this is for purposes of explanation only. The claims should not be interpreted to require action by any such example actor unless explicitly required by the language of the claims themselves.

I. Brief Description of Certain Embodiments

Certain embodiments provide a method. The example method includes receiving, by a computing device, market data related to a tradeable object. The example method includes displaying, by the computing device, a flexible price-volume indicator, the flexible price-volume indicators aligned with a specific value level in a value axis. The example method includes updating, by the computing device, a display property associated with the flexible price-volume indicator, the display property reflecting a quantity value determined based on the received market data. The example method includes displaying, by the computing device, the flexible price-volume indicator in a differentiated state based on a change in the market data.

Certain embodiments provide a tangible computer readable storage medium including instructions. The example instructions, when executed, cause a computing device to at least receive, by the computing device, market data related to a tradeable object. The example instructions, when executed, cause the computing device to at least display, by the computing device, a flexible price-volume indicator, the flexible price-volume indicators aligned with a specific value level in a value axis. The example instructions, when executed, cause the computing device to at least update, by the computing device, a display property associated with the flexible price-volume indicator, the display property reflecting a quantity value determined based on the received market data. The example instructions, when executed, cause the computing device to at least display, by the computing device, the flexible price-volume indicator in a differentiated state based on a change in the market data.

Certain embodiments provide an apparatus. The example apparatus includes a computing device including a processor and a memory. The example processor is configured to execute instructions in the memory to at least receive, by the computing device, market data related to a tradeable object. The example processor is configured to execute instructions in the memory to at least display, by the computing device, a flexible price-volume indicator, the flexible price-volume indicators aligned with a specific value level in a value axis. The example processor is configured to execute instructions in the memory to at least update, by the computing device, a display property associated with the flexible price-volume indicator, the display property reflecting a quantity value determined based on the received market data. The example processor is configured to execute instructions in the memory to at least display, by the computing device, the flexible price-volume indicator in a differentiated state based on a change in the market data.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
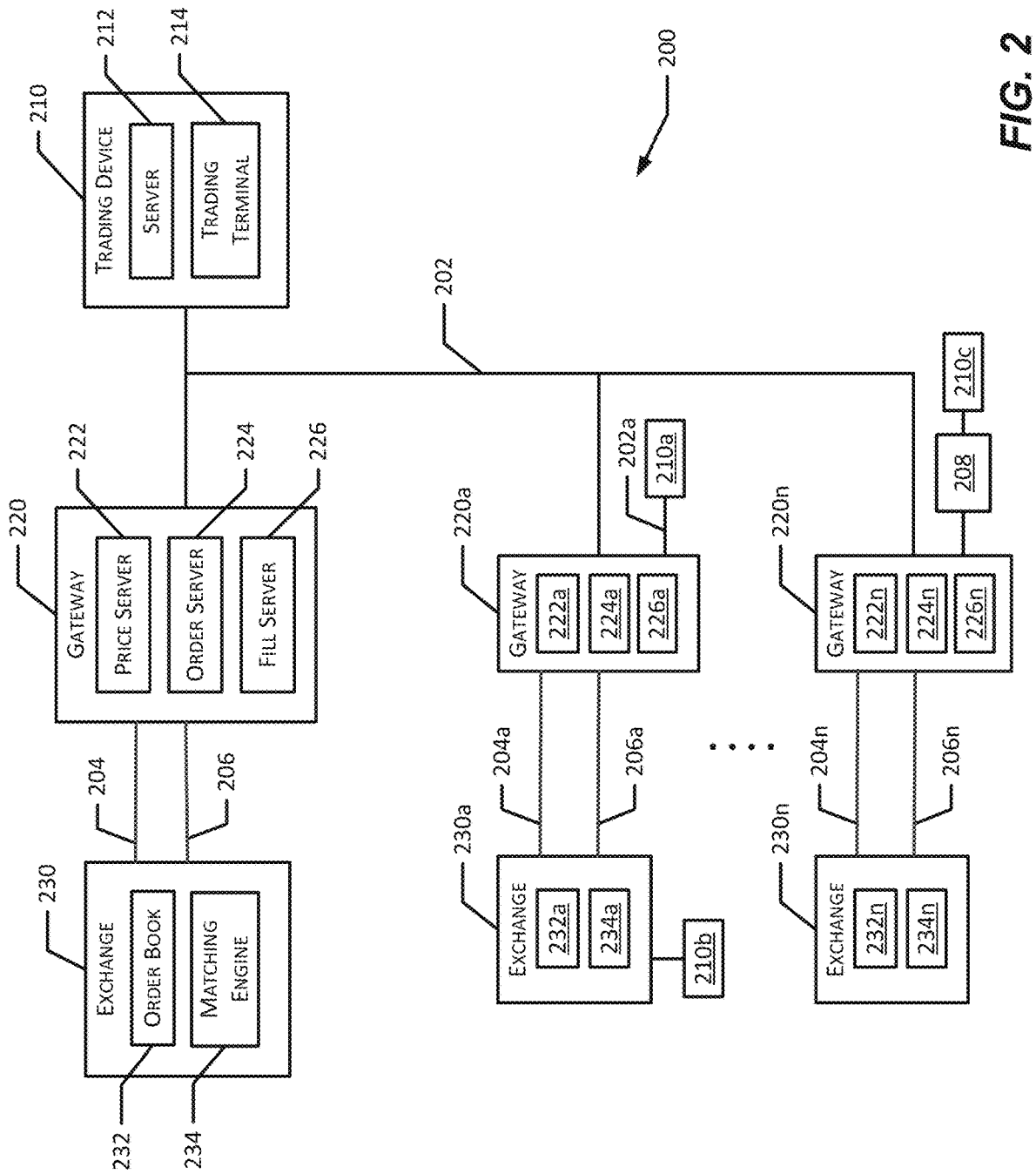
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3:
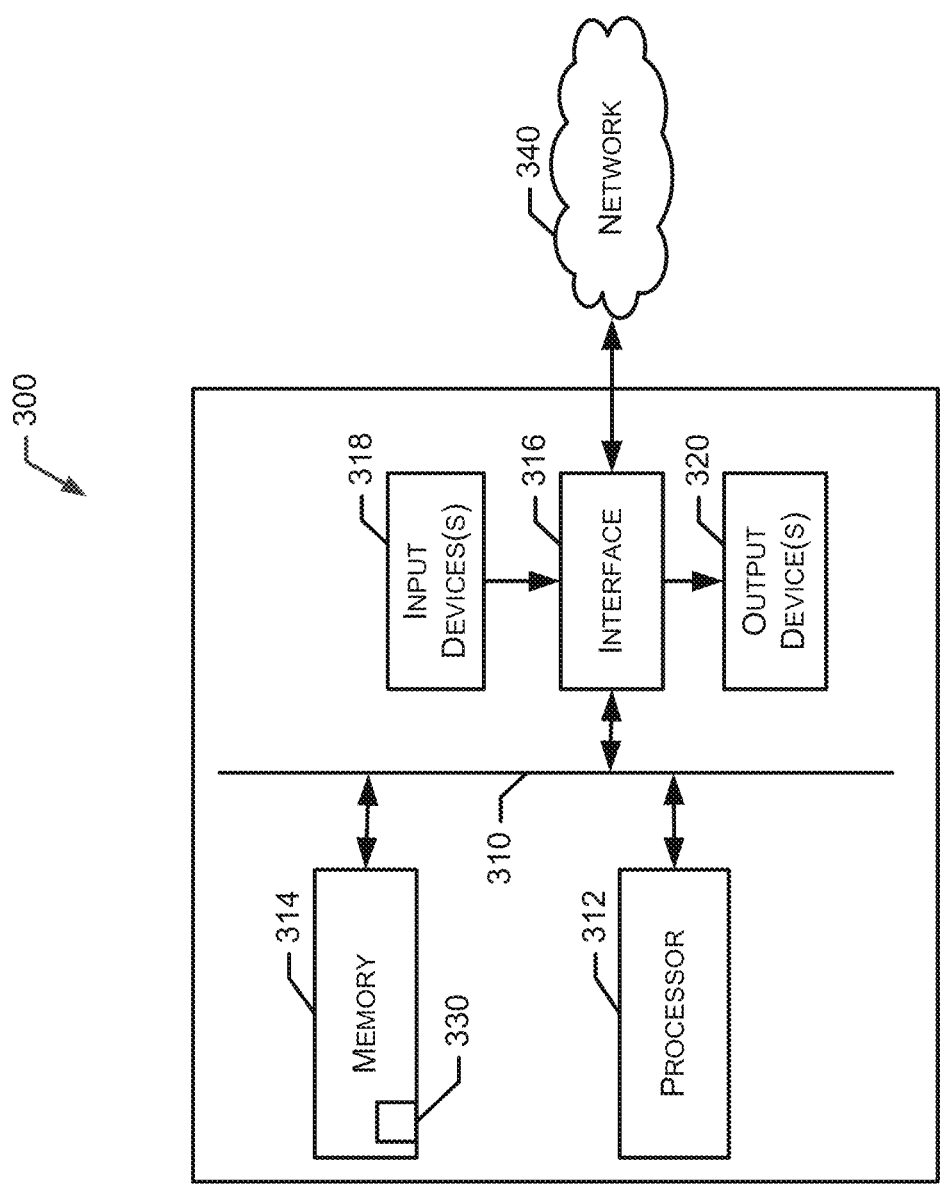
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Trading Interface

FIG. 4A illustrates an example trading interface 400 in which certain embodiments may be employed. The example trading interface 400 shows market data for a tradeable object at a first point in time. While the following examples are described in conjunction with the example electronic trading system 200 of FIG. 2, the examples disclosed herein may be implemented in other electronic trading systems, such as the example trading system 100 of FIG. 1.

As described above in conjunction with FIG. 2, the trading device 210 receives market data related to one or more tradeable objects from the exchange 230 and/or the exchanges 230*a*-230*n* through the gateway 220 and/or the gateways 220*a*-220*n*, respectively. The trading device 210 provides a trading application including trading tools to process and/or organize the market data and provide the example trading interface 400. Trading tools include, for example, MD TRADER®, X_TRADER®, ADL®, AUTOSPREADER®, and AUTOTRADER™, each provided by Trading Technologies. The trading device 210 provides the trading interface 400 to enable a user to view market data and communicate trade orders and trade actions with an electronic exchange.

In the illustrated example of FIG. 4A, the trading interface 400 includes a bid column 402, a value column 404, and an ask column 406. The trading interface 400 further includes a working order (W/O) column 408 and a last traded quantity (LTQ)/last traded price (LTP) column 410. The trading interface 400 may include other columns such as an estimated position in queue (EPIQ) column, a single combined bid/ask column, a user-defined indicator column, an inside market indicator column, and/or any other column for providing indicators. The trading interface 400 also includes rows such as row 412. The columns intersect with the rows to define cells such as cell 414. In other embodiments, different orientations other than vertical columns may be used (e.g., horizontal and diagonal arrangements).

In the illustrated example, bid indicators representing the bid quantities of the tradeable object are displayed in the bid column 402, value indicators corresponding to value levels are displayed in the value column 404, and ask indicators representing the ask quantities of the tradeable object are displayed in the ask column 406. A bid quantity is a quantity available on the bid side of the tradeable object at a given value level. The value levels can be configured to represent prices, net change, derivatives of price, consolidated prices, synthetic tradeable object pricing, spread pricing, and/or other representations of value. The ask quantity is a quantity available on the ask side of the tradeable object at a given value level. The indicators are not limited to numerical values and can include any type or combination of indicator or symbol to illustrate the presence of available quantity without providing a specific numeric value. For example, the indicators may include text, icons, colors, lines, and/or other graphical representations. In one example, the indicators may represent a range of quantity available at particular value levels in place of specific, and frequently changing, quantity values. In another example, the relative size of indicators may proportionally represent the quantity available. In another example, the indicators may represent simply that there is quantity available with no illustration of the amount in excess of zero.

Trading interfaces, such as the trading interface 400, may include indicators to identify the inside market. The inside market indicators may utilize multiple representations to identify the highest bid price and the lowest ask price. The inside markets indicators may also include additional information such as information related to quantities at the inside market. Examples of inside market indicators include a best bid price indicator representing the highest available bid price, a best ask price indicator representing the lowest available ask price, and/or an indicator representing a range between the highest available bid price and the lowest available ask price. As shown in FIG. 4B, the inside market indicator may highlight and identify the range 458 of value levels between the highest available bid price of "96450" and the lowest available ask price of "96525". Inside market indicators may be displayed within the trading interface to identify specific value level(s) in the value column 404. For example, a best bid price indicator may be displayed in a cell containing a bid quantity indicator and corresponding to a value level that reflects the best bid price. As another example, a best ask price indicator may be a color or symbol combined with an ask quantity indicator in the ask column 406 in a cell corresponding to a value level that reflects the best ask price. As another example, inside market indicators may be displayed at value levels within the value column 404 that reflect the best bid price and the best ask price. The inside market indicators can include any type or combination of indicator or symbol (e.g., the indicators may include text, icons, colors, lines, and/or other graphical representations).

In certain embodiments, the inside market indicators may be provided by the presence of a quantity indicator. The presence of a quantity indicator refers to the existence and location of the quantity indicator. For example, the presence of the best bid quantity indicator, independent of the quantity value displayed at any given point in time, in the bid column may be the best bid price indicator. Thus, the existence of a quantity indicator at the highest value level in the bid column is the best bid price indicator. To be clear, in this example, the value of the bid quantity indicator is not part of the best bid price indicator. Rather, the existence of the bid quantity indicator itself at the highest value level in the bid column is the best bid price indicator. In other words, the display of the highest bid quantity indicator is the best bid price indicator. As shown in FIG. 4A, the presence of the bid quantity indicator "151" at the highest value level in the bid column at the price of "96350" is the best bid price indicator 460. Similarly, the presence of the ask quantity indicator "267" at the lowest value level in the ask column at the price of "96375" is the best ask price indicator 462.

From the user's perspective, the trading interface 400 may present and display indicators, such as inside market and LTP/LTQ indicators, in a manner that conveys the appearance of movement relative to the value column 404. For example, the manner in which the trading interface alters the position of the best bid price indicator and the best ask price indicator relative to the value levels within the value column may allow the user to perceive changes in both the speed and direction of trading within a market. The trading interface 400 updates based on received market data. For example, the trading interface 400 moves the best bid price indicator 460 relative to the value column 404 when the received market data includes a quantity at a new highest bid price. As another example, the trading interface 400 moves a LTP indicator 464 (shown in the LTQ column 410 of FIG. 4A) relative to the value column 404 when the received market data includes a new last traded price.

The trading interface 400 shown in FIG. 4A depicts and identifies the inside market via the best bid price indicator 460 aligned with the highest available bid price and the best ask price indicator 462 aligned with the lowest available ask price at a first point in time. For example, the best bid price indicator 460 is moved to reflect the change in the best bid price from "96350" (FIG. 4A) to "96450" (FIG. 4B). Similarly, the best ask price indicator 462 is moved to reflect the change in the best ask price from "96375" to "96525". By observing the movement of the inside market indicators relative to the value column 404 in the described manner, the user can quickly perceive that the market is trading higher.

Moreover, as illustrated in the trading interface 400 shown in FIG. 4A, the bid quantity indicator "151" is at the best bid price "96350" and the ask quantity indicator "267" is at the best ask price "96375". At the second point in time, the displayed quantity indicators are updated to reflect new quantities available. As shown in FIG. 4B, the bid quantity indicator "56" is at the best bid price "96450" and the ask quantity indicator "41" is at the best ask price "96525". Although the quantity values have changed, it is the presence of the bid quantity indicator at the highest value level in the bid column and the presence of the ask quantity indicator at the lowest value level that are the inside market indicators.

From the user's perspective, indicators may appear to move relative to the value column 404. This appearance of movement may result from painting an indicator in a new location on the trading interface 400 or painting over to remove an indicator from the trading interface 400. Painting may include drawing on a surface, multilayer compositing, or other rendering techniques. For example, in the bid column 402, painting a new quantity indicator above the current best bid quantity indicator creates the appearance of upward movement to inform the user that the market has moved. In another example, in the ask column 406, painting over the best ask quantity indicator to remove it from the trading interface 400 results in the appearance of upward movement in the market. As another example, other indicators such as the LTP indicator 464 can appear to move relative to the value column 404 using these techniques.

The movement of the indicators relative to the value column 404 may be implemented in a variety of ways. In certain embodiments, movement of an indicator includes repositioning the indicator from one location to another location. For example, the best bid price indicator may be a graphical user interface element or object, such as a line, shape, arrow, or sprite, the on-screen position of which is changed to a new location representing a new best bid price. In certain embodiments, movement of an indicator includes removing the indicator at one location and replacing it with a new indicator at another location, which as user may perceive as the appearance of movement. For example, the best bid price indicator may be a yellow background color for a cell in the value column 404. When the best bid price changes, the background color for the cell is changed to default color (e.g., black) and the background color of a second cell associated with the new best bid price is changed to yellow to provide the new best bid price indicator. In certain embodiments, the object representing the best bid price indicator may change from one location to another location. For example, the value, color and/or shape of the best bid price indicator may change from one location to another location.

When quantity information is displayed in relation to the value column 404 and the market moves up or down, the inside market indicators can be said to "move" up or down from the user's perspective in relation to the value column 404 to reflect a new highest bid price or a new lowest ask price. For example, when the quantity indicators are represented with numerical values and the inside market indicators are provided by the presence of the highest bid quantity indicator and lowest ask quantity indicator, the exact numeric value representing the quantity at the best bid price or the best ask price need not move or provide the appearance of movement. The quantity indicators, in this particular example, at those particular price levels may have changed, but they do not actually move—it is the best bid indicator that has "moved."

The value indicators in the value column 404 may be repositioned. A selected value indicator may be repositioned to a designated location and other value indicators are repositioned relative to the selected value indicator. The selected value indicator may be based on, for example, a user selection or market related values such as the highest bid price or lowest ask price, LTP, and a calculated average of the best bid and best ask prices. The designated location may be a pre-determined location or a location defined by a user. In one configuration, in response to the repositioning command, the selected value indicator may be moved to the designated location corresponding to the middle of the display (e.g., to a location corresponding substantially to the midpoint of the length of the value column 404). In another configuration, in response to the repositioning command, the selected value indicator can be displayed at a user-identified or pre-defined position within the display. From a user's perspective, repositioning is the appearance of movement of values in the value column 404 to new locations in the value column 404. This appearance of movement may result from repainting the values in the value column 404.

The value indicators in the value column 404 may be repositioned in response to various commands or triggering conditions. In one example, the value indicators displayed in the value column 404 may be repositioned in response to a triggering condition. Some examples of a triggering condition include: a user input; expiration of an alarm or timer; a determination that the inside market is, or may be, moving off the display; a determination that the inside market has exceeded an upper threshold or a lower threshold; an event in another trading interface; a market event relating to the same or a different tradeable object; a user-defined event; and/or a determination that a value exceeds a threshold.

In some examples, an indicator based on market data (such as best bid, best ask, LTP) may be displayed at the same fixed location in the trading interface 400. For example, the best bid indicator in the bid column 402 may be displayed at a specified fixed location. The fixed location may be pre-determined or defined by a user. For example, the best bid indicator and/or the best ask indicator may, for example, be maintained at the center of the display, at the top of the display, at the bottom of the display or any designated location.

In the illustrated example, the values, which are prices, are displayed without decimal points (which may be a format or convention expected by a user) and in descending order from a top to a bottom of the value column 404 in the orientation of FIG. 4A. In other examples, the prices are listed in other orders (e.g., ascending order from top to bottom) and/or formats (e.g., with decimal points, fractions, in scientific notation, and/or any other format).

In the illustrated example, the indicators in the bid column 402 and the ask column 406 are updated to indicate quantity changes at each value level identified along the value column 404. For example, values of the ask quantities and/or the bid quantities may increase or decrease due to order quantities being added, deleted or matched at each value level. The indicators may be updated based on a timer and/or in response to new data being received, for example.

In some examples, the trading interface 400 includes additional and/or different information. In the illustrated example, the trading interface 400 also displays a net price change 416 of the tradeable object over a given amount of time (e.g., since the market opened on a given day). The trading interface 400 also includes a total volume 418 of the tradeable object (e.g., a number of lots that have been traded). Other embodiments may include different and/or additional information.

The trading interface 400 also enables the user to specify parameters for a trade order. In the illustrated example, the trading interface 400 includes a quantity field 420. The quantity field 420 displays a quantity (e.g., 5) for an order that the user will send to market, and the user may adjust the quantity by selecting (e.g., via a mouse) one of a plurality of buttons 422 adjacent the quantity field 420 or entering a new value into the quantity field 420. If the user selects a button 424 labeled "CLEAR" in the illustrated example, the quantity field 420 is cleared (e.g., the quantity displayed in the quantity field 420 is adjusted to be zero).

The trading interface 400 further enables the user to enter an order to buy or sell a tradeable object via an order entry area configured to receive a selection and in response initiate placement of the order. Selection of an order area may be by a single action of an input device such as a single click, a double click, or a multi-touch gesture. Initiating placement of an order may include preparing a message to send an order to an exchange or sending an order to an electronic exchange. The trading interface 400 may include multiple order entry areas. The trading interface 400 may request that a user confirm an order to be placed prior to sending it.

Order entry areas may overlap or encompass one or more regions of a trading interface. For example, an order entry area may overlap all or part of the cells making up a row. As another example, an order entry area may overlap all or part of the cells in a column such as the bid column, ask column or value column. In another example, an order entry area may overlap a cell and a region outside of the cell. In certain embodiments, a trading interface may include a first order entry area overlapping first cell and a second order entry area overlapping a second cell. In certain embodiments, a first order entry area overlaps a first cell and a portion of a second cell, and a second order entry area overlaps a portion of the second cell and a third cell. In certain embodiments, order entry areas may encompass other regions of the trading interface.

Each order entry area may align with a value level. For example, an order entry area may be aligned with one of the value levels making up the value column 404. In another example, an order entry area may be independent of and not aligned with a value level.

An order entry area may be linked to other elements of the trading interface 400. For example, an order entry area may be linked to a particular value level making up a value column by specifying a value level followed by specifying an order entry area. Subsequently, selection of the linked order entry initiates placement of the order based on the linked value. As another example, selection of a cell associated with a particular value level may link a pre-defined order entry area to the particular value level.

Upon selection of an order entry area to initiate placement of an order, one or more parameters of the order may be determined based on the selected order entry area. Order parameters may include order price, order quantity, order side, and/or order type. Other order parameters may be specified. Values for the parameters may be default values, preconfigured values, previously determined values, values set based on the location of the selection within the order entry area, values set based on the location of the order entry area, values set based on the method of the selection (e.g., a left click, a right click, a keyboard entry and a double click).

The manner in which the selection of an order entry area is made may affect the type of order or the way in which placement of an order is initiated. For example, selection within a row configured as an order entry area may include correlating the position of the selection to a specific cell or column arranged and aligned relative to the order entry area. The type of single action provided via the input device may further specify the selection. For example, if the user initiates a single action corresponding to a right click within an order entry area aligned with a portion of the row corresponding to a cell in the value column, then the selection may initiate placement of a buy order. Similarly, if the user initiates a single action corresponding to a left click over a portion of the row corresponding to a cell in the value column, then the selection may initiate placement of a sell order. As another example, selecting an order entry area encompassing the cells in the bid column may initiate placement of a buy market order when the selection is a single point touch applied to a touch sensitive interface and a buy sweep order when the selection is a two point touch to the touch sensitive interface.

Figure 4C:
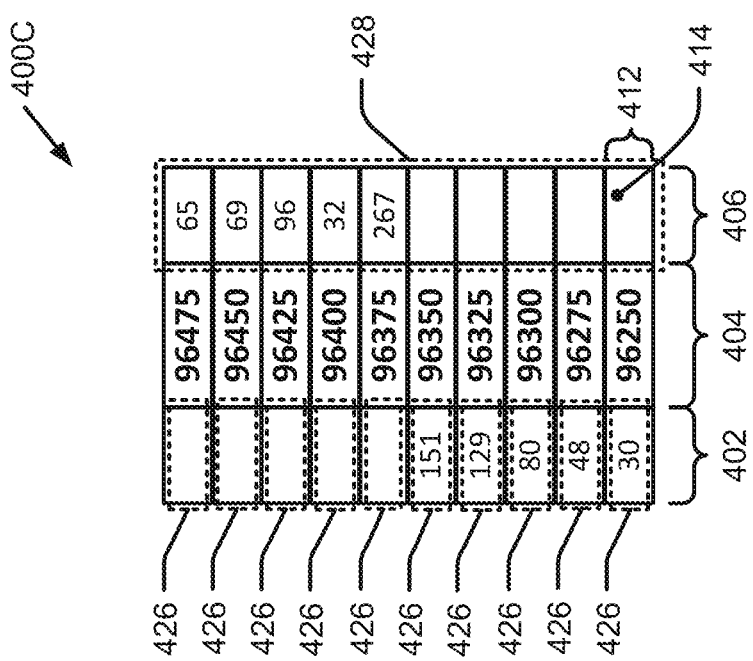
Figure 4D:
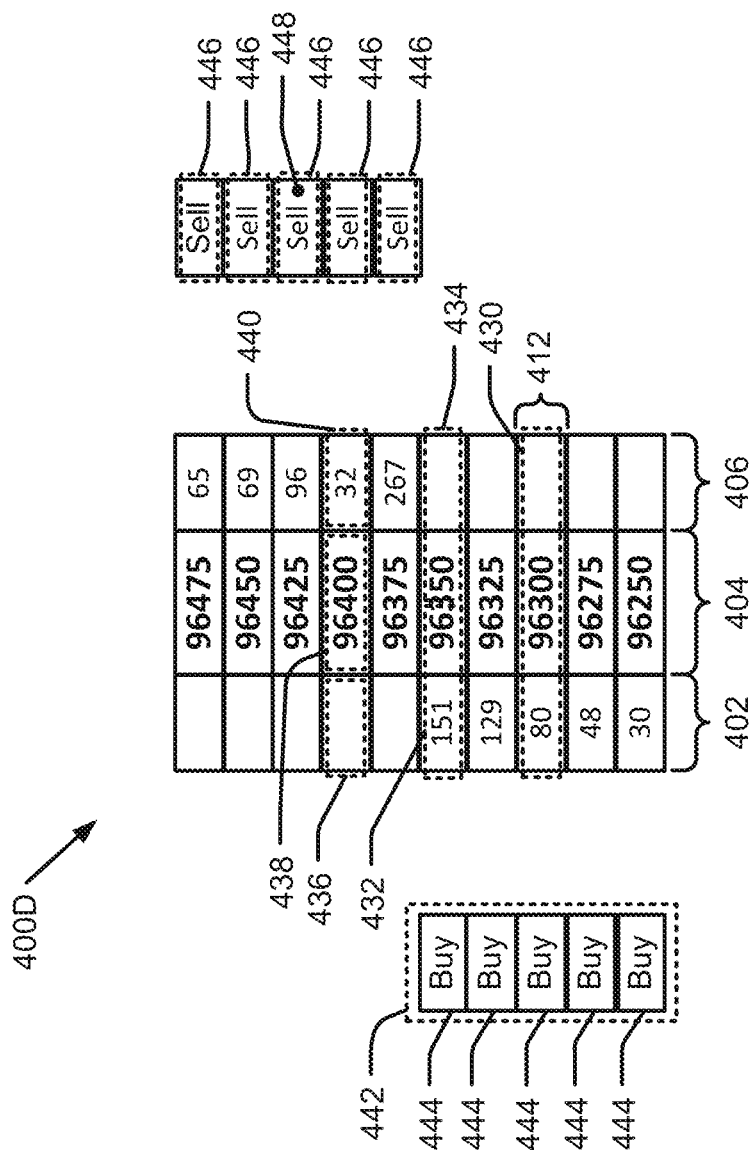
Figure 4E:
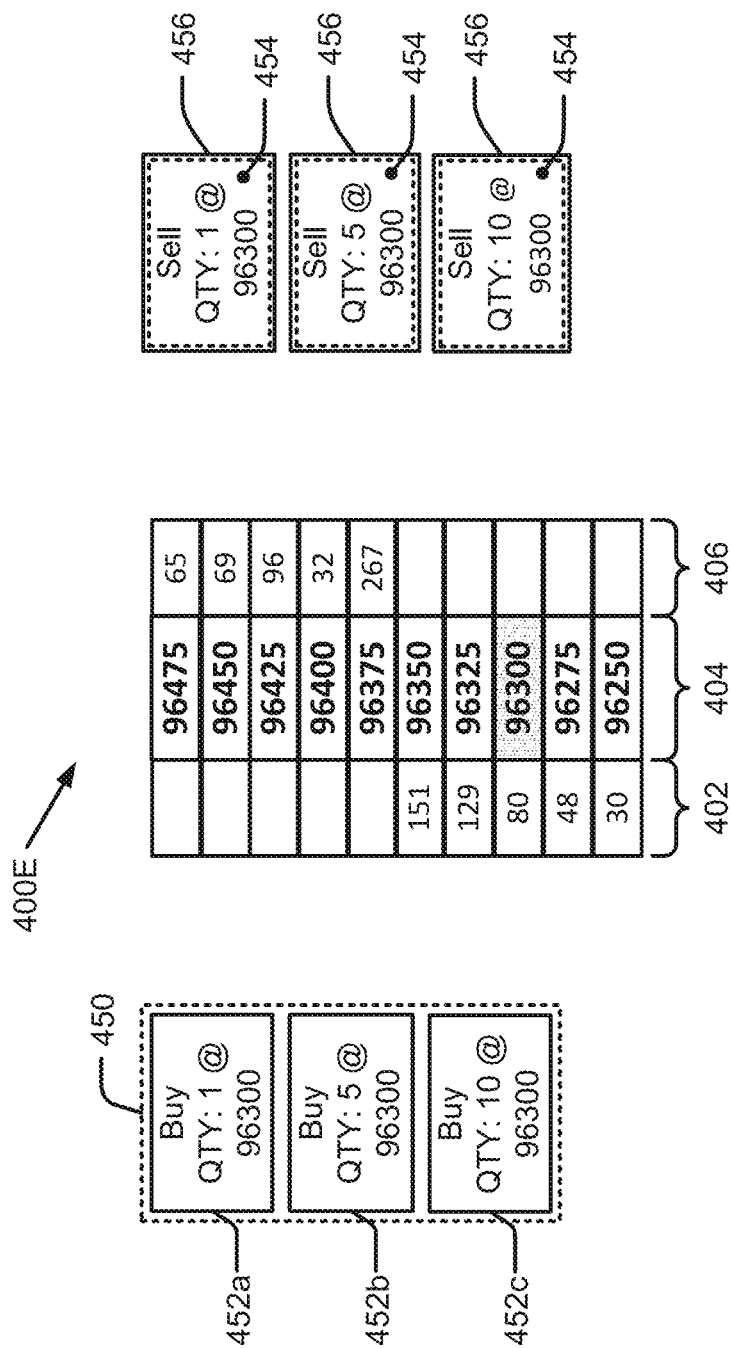

FIGS. 4C to 4E illustrates examples of order entry area configurations that may be utilized to initiate placement of an order. FIG. 4C illustrates one configuration of a trading interface (identified as trading interface 400B) including order entry areas overlapping each cell making up a column. For example, selection of a particular order entry area 426 in bid column 402 may initiate placement of an order to buy a default quantity at the value level aligned with the selected order entry area. In operation, when the user selects an order entry area 426 overlapping the cell containing the bid quantity "80" in the illustrated example, the trading device 210 sends an order to sell a default quantity of 4 displayed in the quantity field 420 (see FIG. 4A) at a price of "96300".

FIG. 4C further illustrates another configuration of the trading interface 400C including an order entry area overlapping an entire column. For example, selection within a portion of the order entry area 428 overlapping the ask column 406 initiates placement of an order to sell a default quantity at the value level corresponding to the selected portion of the order entry area. In operation, when the user selects within the order entry area 428 at a location corresponding to the cell displaying the ask quantity "69" in the illustrated example, the trading device 210 sends an order to buy a default quantity of 5 displayed in the quantity field 420 at a price of "96450".

FIG. 4D illustrates another configuration of a trading interface (identified as trading interface 400D) including order entry areas overlapping cells defined within one or more of the columns in the same row. For example, an order entry area 430 may overlap a row 412 containing cells within each of the columns 402 to 406. In operation, selection within any portion of the order entry area 430 overlapping the row 412 initiates placement of an order to either buy or sell a default quantity at a price of "96300". Determination of the side (e.g., buy or sell) of the order may be based on the method of the selection (e.g., a left click to initiate a buy order and a right click to initiate a sell order) and/or the position at which the selection was made (e.g., within a portion of the order entry area overlapping the buy column 402, within a portion of the value column 404 closer to the ask column 406. In another example, a first order entry area 432 overlaps a first cell in column 402 and part of a second cell in column 404, and a second order entry area 434 overlaps part of the second cell in column 404 and a third cell in column 406. In another example, individual order entry areas 436, 438 and 440 overlap aligned cells in each of the columns 402, 404 and 406.

FIG. 4D further illustrates order entry areas overlapping other elements of the trading interface 400D and aligned with the value levels of the value column. For example, an order entry area 442 encompasses multiple "Buy" elements 444 where each element 444 is aligned with a value level of the value column 404. In operation, selection within the order entry area 442 initiates placement of an order to buy a default quantity of the tradeable object. The order is at the price associated with the value level aligned with the element 444 at the location of the selection. In another example, order entry areas 446 overlay each individual "Sell" element 448, where each element 448 is aligned with a value level of the value column 404. In operation, selection of an order entry area 446 aligned with the cell in the value column 404 displaying the price "96425" results in a sell order for a default quantity being sent at the value level associated with the aligned cell.

FIG. 4E illustrates another configuration of a trading interface (identified as trading interface 400E) including order entry areas overlapping elements not aligned with the value levels of the value column. For example, an order entry area 450 encompasses multiple "Buy" elements 452*a*-452*c* configured to display different pre-set quantity levels and the currently selected price level. In operation, selection of a value level corresponding to the cell displaying the price "96300" links the selected value level with the order entry area 450. Another selection of a portion of order entry area 450 overlaying the element 452*b* results in a buy order for a quantity of 5 being sent at the linked price. Similarly, individualized order entry areas 454 overlaying "Sell" elements 456 may be selected to initiate placement of a sell order at a pre-defined quantity associated with the corresponding element 456 at the linked price.

VI. Depicting Volume Information Using a Graphical Indicator

As described above, one or more market indicators can include any type or combination of indicator or symbol (e.g., the indicators may include text, icons, colors, lines, and/or other graphical representations). Certain examples provide systems and methods to visualize changes in volume with respect to a value axis, such as a price or value indicator 504. A flexible price-volume or volume-at-price (VAP) indicator can be used to visualize a change in volume at a price or value. For example, a flexible price-volume indicator can be implemented as a single indicator to reflect a presence of volume at a specific price level, and/or as a series of indicators to reflect an absolute volume at a specific price level and/or a relative volume at a specific price level. The flexible price-volume or VAP indicator can be used to provide additional information (e.g., alphanumerically and/or graphically) to a trading interface, such as the trading interface 400-400E described above.

In some examples, a VAP indicator can be provided in an additional column of a trading interface, such as the trading interface 400-400E. The additional column shows a volume that traded at a price the last time that price traded on the exchange.

Figure 5:
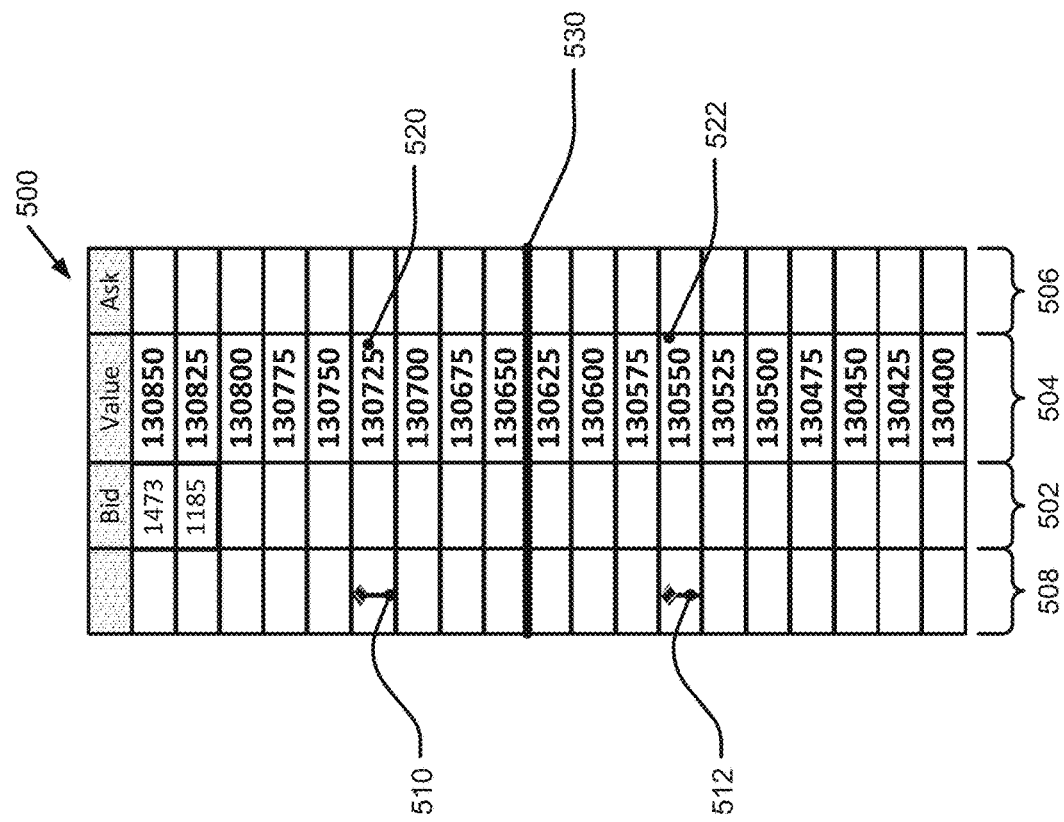
FIG. 5 illustrates an example trading window or interface which may be used to implement the disclosed embodiments.

FIG. 5 illustrates an example trading interface 500 including an additional VAP column 508 providing one or more price-volume indicators in conjunction with values 504. While the following examples are described in conjunction with the example trading device 210 of FIG. 2 and the example electronic trading system 200 of FIG. 2, the examples disclosed herein may be implemented using any trading device in any other electronic trading system such as the example trading device 110 of FIG. 1.

As described above in conjunction with FIG. 2, the example trading device 210 receives market data related to one or more tradeable objects from the exchange 230*a* and/or the exchange 230*n* through the gateway 220*a* and/or the gateway 220*n*, respectively. The example trading device 210 runs a trading application providing a trading tool to process and/or organize the market data and provide the example trading interface 500 of FIG. 5 (similar to the example trading interface 400-400E of FIGS. 4A-4E described above). The example trading device 210 displays the trading interface 500 to enable a user to view the market data and execute trades via the electronic exchange 230*a* and/or the electronic exchange 230*n* using the trading device 210.

As shown in the example of FIG. 5, a trading interface 500 may be provided by a trading device 210 to enable a user to monitor market data related to a tradeable object, execute trades of the tradeable object and/or perform other actions. In some examples, prices of the tradeable object, ask quantities, bid quantities and/or other information are displayed on the trading interface 500 to enable the user to view a market depth of the tradeable object (e.g., bids to buy the tradeable object, offers to sell the tradeable object, etc.). As the tradeable object is traded on the market, the market depth of the tradeable object may change. For example, a price of the tradeable object may increase, decrease, fluctuate or be substantially constant while the volume of trades of the tradeable object increases, decreases, fluctuates, or is substantially constant. A relationship between the price and the volume of the tradeable object may influence whether the user executes a trade. For example, if the user detects that the price and the volume of trades are decreasing, the user may go long. Present and/or historical trends with respect to price and volume can also be instructive for future treading. For example, if the user sees that price is increasing toward a certain price and that volume has historically increased at that price, the user may be tempted to buy before that price and sell at that price. The example trading interfaces 500 disclosed and described herein include a graphical indicator 510, 512 to indicate flexible price-volume or VAP information for a given price, thereby providing the user with a visual cue and enabling the user to access additional information regarding the past volume, for example. The example graphical indicators disclosed herein are updated (e.g., substantially continuously or periodically) based on market data communicated to the trading device to enable the graphical indicator to indicate the trend on a periodic, rolling or up-to-date basis.

In some examples, the graphical indicator 510, 512 is an object or icon such as an arrow, traffic light, flag, pin, etc., which is displayed on the trading interface. In other examples, the graphical indicator 510, 512 is formed by components of the trading interface such as lines, areas, text and/or any other components. In some examples, the graphical indicator 510, 512 indicates a prior volume of trades of the tradeable object at a certain value using one or more colors, shadings, patterns, icons, and/or other indicators. In some examples, a change in volume may be represented by a color gradient extending from one end to another end of the graphical indicator 510, 512 to indicate a direction in which the volume increased (e.g., increasing or decreasing) and/or an amount of change of the volume of trades.

As shown in the example of FIG. 5, a graphical indicator 510, 512 is displayed on the example trading interface 500 to visually indicate trade activity (e.g., historical and/or current trade activity) at a particular price level. In the illustrated example, the graphical indicators 510, 512 indicate a market trend (e.g., a historical and/or current market trend) between a volume of trades of the tradeable object and a price of the tradeable object. The market trend between the volume and the price is a pattern, correlation and/or relationship between the volume and the price. For example, the graphical indicator 510, 512 may utilize a color or shape change to indicate that the price is increasing, decreasing or substantially constant as the volume is increasing, decreasing or substantially constant. In some examples, the graphical indicator 510, 512 is updated (e.g., periodically or substantially continuously) to indicate updated VAP data.

The example trading interface 500 provides a VAP column 508 including one or more visual indications 510, 512 of market volume at a given price for a tradeable object, in addition to listing the market data (e.g., value 504, bid quantity 502, ask quantity 506, volume, etc.) related to the tradeable object. In other examples, the graphical indicator 510, 512 is displayed with respect to the trading interface 500 in other ways. For example, the graphical indicator 510, 512 may be displayed alongside the example trading interface 500. In some examples, the graphical indicator 510, 512 may be displayed in a first window or browser provided by the trading device 210 while the market data and/or the trading interface 500 is displayed in a second window or browser provided by the trading device 210. In some examples, graphical indicators 510, 512 may be overlaid on market value data 504 via the trading interface 500. In some examples, the graphical indicator 510, 512, market data, and trading interface 500 are displayed via a plurality of trading devices 210*a-n*.

In some examples, the graphical indicator 510, 512 indicates volume data at a price over a period or window of time. In some examples, the window of time begins a predetermined amount of time before a current time and ends substantially at the current time. In other examples, the window of time is defined with respect to a previous day, month, event, etc. In some examples, the graphical indicator 510, 512 represents a currently measured volume of trading activity at the price level.

The example graphical indicators 510, 512 in VAP column 508 of FIG. 5 indicate a volume of trades of a tradeable object at a price level over a specified window of time. In some examples, the graphical indicator 510, 512 indicates a level of volume of the trades. The level of volume is the volume of trades of the tradeable object relative to a reference volume such as an average or median volume. In some examples, the median or average volume is determined based on volumes detected over a period of time, which may include, overlap or exclude the window of time. For example, the median volume may be determined based on volumes detected during a previous trading day. In some examples, if the period of time includes or overlaps the window of time, the trading device 210 updates the median volume as example trading device 210 receives market data including the volume of trades during the window of time. In some examples, the level of volume is determined or calculated in units of percentile. For example, the median volume detected over the period of time may be a 50th percentile, a highest volume detected in the period of time may be a 99th percentile and a lowest volume detected in the period of time may be a 1st percentile.

In some examples, the graphical indicator 510, 512 employs colors to indicate the level of volume of the tradeable object. For example, a green indicator 510 indicates that volume has been detected or determined within a prescribed period of time at a particular price level. A red indicator 512 indicates that volume has not been detected or determined within a prescribed period of time at a particular price level. Thus, in the illustrated example, the graphical indicators 510, 512 visually indicate a relationship between the volume and a change of the price.

While FIG. 5 provides example graphical indicator 510, 512, other example graphical indicators have other shapes, forms, appearances, features, sizes and/or characteristics. For example, the graphical indicator 510, 512 may be a symbol, an icon, an object and/or other type of graphical indicator. In some examples, the graphical indicator 510, 512 is generated via components of the interface 500 by, for example, displaying lines of the interface 500 in different and/or varying line thicknesses, colors and/or patterns; displaying one or more patterns and/or colors on one or more areas or portions of the interface 500; displaying numerals and/or text (e.g., the volume at a particular price value) in different and/or varying colors, line thicknesses, line patterns, fonts, sizes, etc. In some examples, the graphical indicator 510, 512 is generated by flashing, blinking and/or moving one or more portions of the example interface 500.

In the example of FIG. 5, disclosed flexible price-volume indicators 510, 512 are used to identify a presence of volume at or above and below price levels 520 (a value of 130725) and 522 (a value of 130550). For example, the flexible price-volume indicator 510 identifies that volume has (within a prescribed period) been detected or determined at the 130725 price level 520. The price-volume indicator 510 can be green, for example, to indicate that a volume or quantity value has been found in the time/date range at the specified price and/or price level. Similarly, the flexible price-volume indicator 512 identifies that volume has not (within a prescribed period) been detected or determined at the 130505 price level 522. The flexible price-volume indicator 522 can be red, for example, to indicate no historical volume has been found in the time/date range at the specified price.

Figure 6:
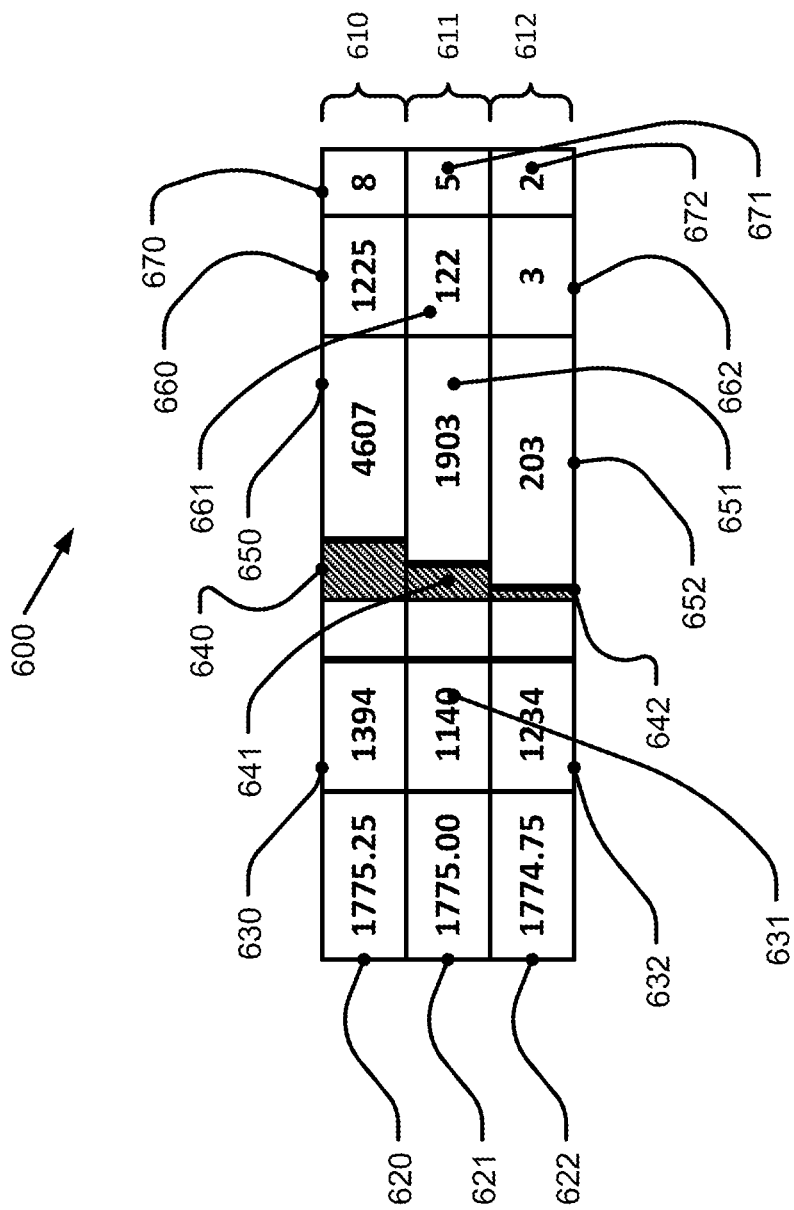
FIG. 6 illustrates an example trading window or interface which may be used to implement the disclosed embodiments.

Certain examples include additional information in a detailed VAP to provide traders with a quick, concise view of trade activity at one or more specific price or value levels. In the example of FIG. 6, a trading interface 600 provides a visualization of a series of flexible price-volume indicators 610-612, each indicator 610-612 providing a visual indication or representation of trade activity at a given price level 620-622 for a particular tradeable object. As shown in the example of FIG. 6, each row 610-612 includes a price 620-622, a current ask 630-632, a VAP indicator bar 640-642, a current volume of objects (e.g., contracts) traded 650-652, a historical volume of objects traded 660-662, and a number of transactions 670-672 associated with the historical volume of trades 660-662.

The example trading interface 600 conveys supplemental information regarding a tradeable object. For example, the interface 600 provides a visual indication of activity through indicator bars 640-642. The example interface 600 also provides an alphanumeric indication of activity through text values representing the current trading volume 650-652 and historical cumulative volume 660-662 at a given price level 620-622 for the tradeable object.

As shown in the example of FIG. 6, a series of flexible price-volume indicators 610-612 may be utilized to display and/or track movement of volume 650-652, 660-662 along price levels 620-622 in a value axis. In one example, a color of the indicator 640-642 may be changed to represent a relative volume 660-662 at a given price level 620-622. In another example, a size of the indicator 620-622 may represent a relative volume 660-662 at a given price level 620-622. The relative volume 660-662 can be referenced with respect to: a particular time period, time of day, volume within a reference cell, an adjacent value level, etc., for example. In the example interface 600, current 650-652 and historic 660-662 volume information for the price level 620-622 is provided in conjunction with a current ask 630-632, a visual indicator 640-642, and a number of trades 670-672 for the historic VAP data 660-662.

The example of FIG. 6 illustrates an example market in which a current VAP 651 for a tradeable object at a price 621 of 1775.00 equals 1903, indicating that 1903 contracts have traded during the particular trading session. The example interface 600 further includes historic information 661 showing how many contracts were traded the last time the market traded at that price level 621. As the market moves up and down throughout the day, for one or more tradeable objects 610-612, the example interface 600 provides a VAP for the current session 650-652, as well as an historical VAP 660-662 from a previous time in which the market moved through the same price level 620-621. The interface 600 further provides a number of transactions 670-672 associated with the historical volume 660-662.

For example, as shown in FIG. 6, in a current trading session, the market may move down from price or value level of 1775.25 and trade at a price or value level of 1775.00 in five transactions for a total quantity of 122 before trading next at 1774.75 (or 1775.25 again). The trading interface 600 shows that the last time the market traded at a price value (621) of 1775.00, 122 contracts (661) traded in five total transactions (671).

Thus, the example trading interface 600 provides current 650-652 and historical 660-662 VAP information in a variety of formats for user review (and, in some cases, selection). In certain examples, a size and/or color of the indicator bars 640-642 visually conveys current and/or historic VAP for the price level 620-622.

In some examples, past contracts are evaluated to characterize them. For example, past contracts at the particular price level 620-622 are evaluated and identified as having a majority (e.g., 100 of the 122 contracts traded at 1775.00 in the example of FIG. 6) traded at the bid or as aggressive sells. The trading interface cell conveying the historic VAP 661 may then be shaded a first color (e.g., red, light red, etc.,) and/or otherwise colored, patterned, etc., to indicate that, when the market last traded at this level, more aggressive selling occurred than aggressive buying at the price. If, however, more aggressive buying occurred in the prior instance, the cell may be shaded a second color (e.g., blue, light blue, etc.) and/or otherwise colored, patterned, etc., to indicate the historic trend. For a trader, this could indicate there may be buy stops above 1775.00 as traders may have recently gone short from that level 621, for example.

In some examples, the trading interface 600 may include or be associated with a timer indicating a time period associated with the VAP information. For example, one or more of the price-volume indicators 610-612 can be configured to show the volume 660-662 and number of trades 670-672 over a discrete trailing time period (e.g., the volume at the given price over the last 30 minutes, volume at price over the last 5 minutes, etc.). In another example, change in volume over time can be stored and replayed to provide a visual representation of the changes in the market over a period of time.

In certain examples, a trading interface allows a user to interact with the interface to mark a price level and/or other displayed information. By marking, flagging, tagging, etc., a price level and/or other information, a user can set visual and/or programmatic cues in relation to the displayed information. For example, a trader can visually mark a price level to tag that price level for reference (e.g., when the price hits the marked level, the trader and/or the trading application will do something, etc.). In some examples, marking a price level generates a notification of trade(s) occurring at that price level. In some examples, marking allows the trader to know where a contract traded in a certain time period when perhaps the trader was not otherwise paying attention to the contract.

In some examples, a mark set by a trader at a price level triggers a monitoring or surveillance to flag an event that occurs at the marked price level. For example, a price pin placed at a particular price level flags movement of the market (e.g., trades) through the pinned price level. For example, if a trader pins or otherwise flags or tags a price level below the current market value and moves his or her attention elsewhere, the trader is alerted by a message, a visual change in appearance of the pin (e.g., a change in color, a change in size, flashing, etc.), etc., on the trading interface, if the market touches or trades through the pinned price level.

Figure 7:
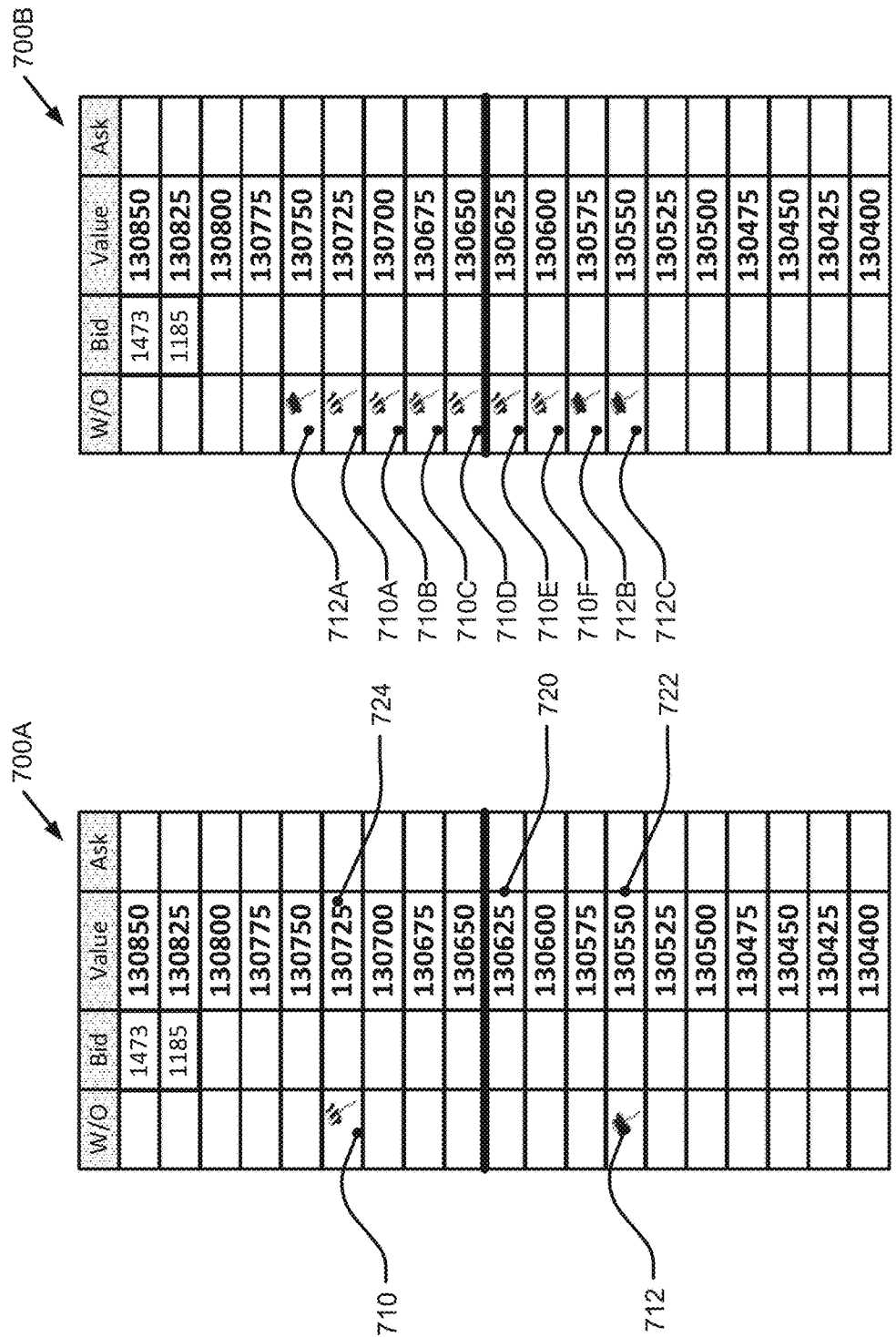
FIGS. 7A and 7B illustrate example trading interfaces including pinned price levels.

FIG. 7A illustrates an example trading interface 700A including pinned price levels. A trader places pins 710, 712 on the trading interface 700A, each pin placed with respect to a price level 722, 724 around a last traded price 720. The trading interface 700A receives placement of a pin 710, 712 and automatically creates a movement threshold or notification trigger with respect to the associated price or value level 722, 724 based on pin 710, 712 placement. Once the LTP moves past (e.g., above or below) a pinned value, the representation of the pin may change to visually alert the trader to the crossing of that market threshold, for example.

In the example of FIG. 7A, the trader places pins 710, 712 at a price above 724 (e.g., at 130725) and below 722 (e.g., at 130500) an LTP 720 (e.g., 130600). After some time, market price for the given contract touches or passes through marked price 710, and the associated pin 710 is altered to reflect a reaching or passing of that price 724 by the market. For example, the pin 710 can change color, change style, provide an animation effect, generate a message, etc., to notify the trader that the pin value has been triggered. In some examples, when the pins 710, 712 are triggered and then the price levels return to prior values, passing the pin level again, one or more stripes, hash marks, etc., can be added to those pins (e.g., in addition to a color change and/or other effect) to indicate how many times the level was broken by trading activity.

If the representation of the pin has not changed (e.g., price pin 712), then the pin value has not yet been reached. Again turning to the example interface 700A of FIG. 7A, the trader places pins 710, 712 above and below the LTP 720, and the trader can see that while the market has traded above the pin 710, at a value of 130725, the market has not yet traded at or below pin 712 (a value of 130550).

Thus, using the example of FIG. 7A, suppose pins 710 and 712 were placed when the object was trading at 130650. Upon placement of the pin 710, 712, the trading interface 700A knows a current state of the market (e.g., trading at value of 130650) as well as a location 722, 724 of each pin (e.g., pin 710 at a value of 130725 and pin 712 at a value of 130550). Based on the location 722, 724, of the pin 710, 712 with respect to the LTP, the trading interface 700A determines that pin 710 represents a "trade above" price of 130725, and pin 712 represents a "trade below" price of 130550. As shown in the example of FIG. 7A, the visual representation of pin 710 has changed (e.g., a different color, a different pattern, lines, animation, etc.) to indicate that the price has traded above a value of 130725 since the pin 710 was placed. Pin 712 remains the same in appearance as when it was placed on the interface 700A, however, so the pin 712 visually depicts that the price has not traded at or below the location 722 corresponding to a value of 130550 since the pin 712 was placed on the interface 700A.

In certain examples, the interface 700A evaluates price and market conditions with respect to a value corresponding to the location 720, 722, 724 when a pin 710, 712 is placed to create a rule/threshold against which market price and/or other market activity is evaluated. One example of a rule that can be created by placement of the pin 710 at the location 724 corresponding to a value of 130725 is as follows:

IF INSIDE_MARKET=130725, THEN
ALTER PIN_COLOR to STATE ALERT;
IF INSIDE_MARKET≥130725 for TIME=120 SECONDS, THEN
ALTER PIN_COLOR to STATE_STABLE
IF INSIDE_MARKET<130725 for TIME<120 SECONDS, THEN
ALTER PIN_COLOR to STATE_ACTIVE.

Tracing through the example, when the inside market moves to the location 724 of the pin 710, then the first condition of the defined rule is met (the inside market equals 130725). Since the first condition of the rule is met, a color of the pin 710 is changed to a color indicative of an alert state (e.g., red, orange, flashing, etc.). Next, a timer is checked in association with the defined rule. In the example, if the inside market stays at or above the pinned 130725 threshold for 120 seconds, then the pin 710 color is changed to a color indicative of a stable state (e.g., blue, green, etc.). However, if the inside market falls below the pinned 130725 threshold and elapsed time is less than 120 seconds, then a color of the pin 710 is changed to a color indicative of an active state (e.g., yellow, pink, etc.).

In certain examples, placement of a pin triggers one or more other actions, such as logging an audit trail, changing a value in a trading strategy algorithm, launching a trading strategy algorithm, stop trading, trigger a trade out, etc. In some examples, placement of a pin with respect to a price level triggers generation of current and/or historical price-volume (VAP) information related to the pinned price level. Placement of pins may be a manual operation that activates a sequence or algorithm detailing one or more desirable actions, calculations, and/or other functionality. In other embodiments, the placement of one or more pins may occur automatically when, for example, a trader's presence is not detected via a webcam or other sensor. For example, a pin 710, 712 may be placed at location 722, 724 (3 ticks away from the inside market) when the trader's face has not been detected in a specified camera range for more than five minutes.

In some examples, if a pin 710, 712 is triggered (e.g., the traded price goes above/below the marked value 720, 722) and the price level then passes back through that marked value 720, 722 (e.g., a LTP 720) before again crossing the pinned threshold 720, 722, the affected pin 710, 712 can be incrementally marked (e.g., increasing shades of a color, added lines, stripes, hash marks, etc.) to indicate a number of times the price has passed the pinned level 720, 722.

Figure 8:
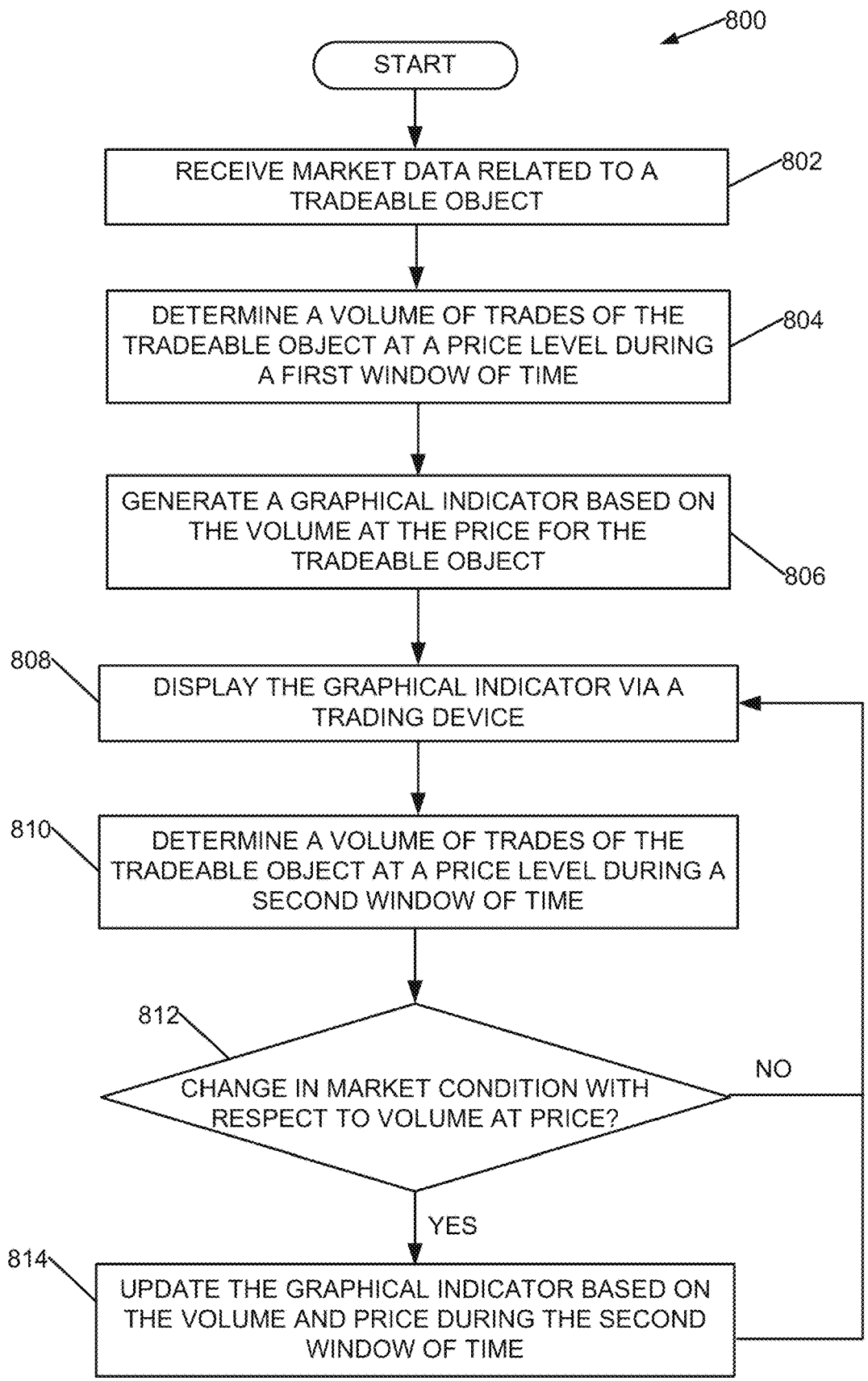
FIG. 8 is a flow diagram representative of an example method to indicate a market characteristic via a graphical indicator.

FIG. 7B another example trading interface 700B including multiple pins 710A to 710F, and 712A to 712C arranged and aligned with respect to multiple price levels. In the illustrated example, a trader places a series of pins 710A to 710F, and 712A to 712C corresponding to multiple price levels 130550 to 130750 as depicted on the trading interface 700B. As trading occurs, the volume at each price level is evaluated against a movement threshold or notification trigger with respect to the associated price or value level. Upon detection or determination of the presence of volume in excess of the threshold at one or more of the flagged price levels, the depiction of the pin is changed from, for example, pin 712B to 710F. In this way, the altered depiction of the pin 710E (i.e., the change from a solid pin to a striped pin) indicates that a threshold quantity has been traded at the corresponding price level since the pins were last reset. In this way, a trader can quickly determine that the volume corresponding to price levels 130600 to 130725 has reached a predetermined threshold while the volume at price levels 130550, 130575 and 130750 has not reached the identified threshold. By evaluating the changes to the pins 710A to 710F, and 712A to 712C, a trader can determine how market has moved since the status of the pins was last reset. The pins can be reset automatically after a period of time (e.g., 10 minutes, 45 minutes) or can be manually reset by the trader. FIG. 8 is a flow diagram representative of an example method 800 to indicate a market characteristic via a graphical indicator. At block 802, market data is received related to a tradeable object. For example, market data including a volume of trades and a price for a tradeable object via a market data feed from an electronic exchange. The market data feed can be a historic data feed providing a prior, historic value or set of values for volume and price for the tradeable object. Alternatively or in addition, the market data feed can be a current (e.g., real-time or substantially real-time (e.g., given processing and transmission delay) data feed from an active exchange market data feed providing a current or immediately prior value or set of values for volume and price of a currently trading tradeable object.

In some examples, the volume of trades is an absolute volume of trades. In some examples, the volume of trades is a relative volume represented as a percentage of the volume relative to previously detected volumes for the tradeable object. In some examples, the volume of trades is a difference between the volume of trades and a median volume of trades over a period of time (e.g., a first window of time).

At block 804, a volume of trades of a tradeable object is determined at a price level during the first window of time. In some examples, the first window of time is a period of time ending substantially with a current or present time at which a trading device is being operated to communicate with an electronic exchange, monitor market data, execute trades of the tradeable object, and/or perform other actions. In some examples, the first window of time represents a prior, historical and/or other reference period of time.

In some examples, a price of the tradeable object is also monitored during the first window of time to associate the volume of trades with a price level for the tradeable object. In some examples, whether the price is changing during the first window of time is determined. For example, it is determined if the price is increasing, decreasing or substantially constant during some or all of the first window of time. In some examples, an amount of the change of the price (e.g., two ticks) during some or all the first window of time and/or a rate of change of the price is determined.

At block 806, based on the volume and the price, a graphical indicator is generated to represent, via a trading interface, the volume (and/or an associated characteristic, trend, etc.) and the price over the first window of time. In some examples, the trend between the volume and the price is a first level of volume associated with a direction of change of the price. In some examples, one or more markings, patterns, colors and/or other features of the graphical indicator indicate the first level of volume. For example, a first portion of the graphical indicator may be a first color to indicate the first level of volume. If the volume changed to the first level of volume during the first window of time, the graphical indicator may include a color gradient (e.g., red to orange to green) to indicate an amount and/or a direction of change (e.g., an increase or a decrease) of the volume during the first window of time. In some examples, an alphanumeric value representing the volume at the price can be displayed via a trading interface in conjunction with the graphical indicator.

At block 808, the graphical indicator is displayed via a trading device. In some examples, the trading device displays the graphical indicator within a trading interface including market data related to the tradeable object (e.g., prices or price levels, volumes, ask quantities, bid quantities and/or other information). In some examples, the trading interface is to be used to execute trades via an electronic exchange. In some examples, the trading interface and/or the graphical indicator includes prices or price levels (e.g., ticks) of the tradeable object.

At block 810, a volume of trades of the tradeable object is determined during a second window of time. The second window of time may overlap a portion of the first window of time. In some examples, the absolute volume of trades of the tradeable object at the particular price is updated. In some examples, the relative volume is updated. In some examples, the median volume is updated based on the volume of trades detected during the second window of time.

At block 812, the volume of trades during the first window of time and the volume of trades during the second window of time are compared to identify a change in market condition with respect to the volume at the price of the tradeable object. In some examples, a change is determined based on an absolute comparison (e.g., are the volumes equal). In some examples, that comparison is associated with a certain tolerance (e.g., are the volumes approximately equal, within a certain range or margin for error). In some examples, a change is identified based on a threshold established with respect to the volume from the first window of time.

Based on this comparison, if a sufficient change has occurred, then, at block 814, the graphical indicator is then updated to indicate the VAP and/or other flexible price-volume information based on the volume and the price during the second window of time. For example, the color of one or more portions or sections of the graphical indicator may be updated (e.g., changed) based on the second volume of trades to indicate, for example, a change between the volume of trades in the second window of time and the volume of trades in the first window of time. In some examples, the graphical indicator is updated to add a feature to the graphical indicator (e.g., a line, animation, hashing, pattern, etc.). The example method 800 shown in FIG. 8 can be repeated for a number of price levels having volume information such that a plurality of visual or graphic indicators are displayed on a trading interface of a trading device. The method 800 can continue to monitor market data and update graphic indicator(s) and/or other market data based on the ongoing monitoring.

Figure 9:
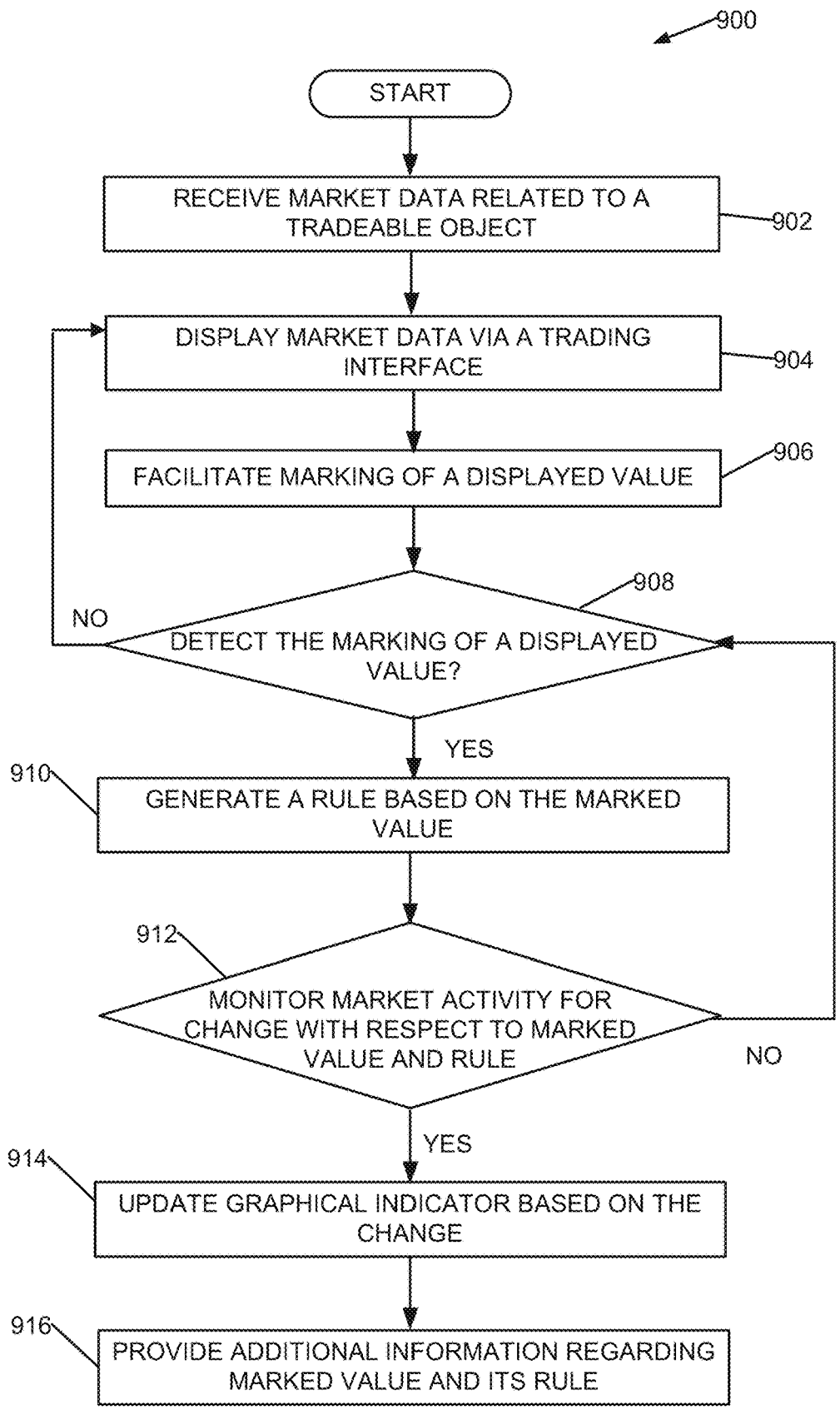
FIG. 9 is a flow diagram representative of an example method to annotate a trading interface.

FIG. 9 is a flow diagram representative of an example method 900 to annotate a trading interface. At block 902, market data is received related to a tradeable object. For example, market data including a volume of trades and a price for a tradeable object via a market data feed from an electronic exchange. The market data feed can be a historic data feed providing a prior, historic value or set of values for volume and price for the tradeable object. Alternatively or in addition, the market data feed can be a current (e.g., real-time or substantially real-time (e.g., given processing and transmission delay) data feed from an active exchange market data feed providing a current or immediately prior value or set of values for volume and price of a currently trading tradeable object.

At block 904, the market data related to the tradeable object is displayed via a trading interface. In some examples, the trading device displays a trading interface including market data related to the tradeable object (e.g., prices or price levels, volumes, ask quantities, bid quantities and/or other information). In some examples, the trading interface is to be used to execute trades via an electronic exchange. In some examples, the trading interface includes prices or price levels (e.g., ticks) of the tradeable object.

At block 906, marking or annotating of a value is facilitated. For example, the trading interface allows a value (e.g., a price, volume, bid, ask, etc.) to be marked, flagged, and/or otherwise annotated via the trading interface. In some examples, a user selects a cell of a displayed trading interface and marks or "pins" that cell and/or its associated row, column, etc., based on the selection. A marking or annotation of a value can be represented by a graphical indicator (e.g., a pin, arrow, marker, etc.) displayed via the trading interface.

At block 908, the marking of the value is detected. For example, the trading interface detects that a data value has been pinned (e.g., that a user has interacted with the trading interface to place a pin and/or other marking on the interface with respect to the value).

At block 910, a rule is generated based on the marked value. For example, the trading device detects that the value has been pinned on the trading interface and automatically generates a rule with respect to the pinned value. For example, the trading device determines that a price higher than the LTP has been pinned and automatically generates a rule and/or other criterion indicating that the trading device is to monitor trading activity for an LTP that meets or exceeds the marked price.

At block 912, market activity is monitored with respect to the marked value and the generated rule. Market activity can be compared to the marked value based on the rule, for example. Thus, if the LTP goes above a pinned value and the associated rule specifies that notification should be made if the LTP exceeds the pinned value, such activity is noted and may trigger subsequent action.

At block 914, the graphical indicator marking the value is updated to reflect that the rule or condition associated with the marking has been met. For example, an LTP that has exceeded a marked price triggers a change in the associated graphical indicator from a solid-colored indicator to a striped indicator (e.g., and/or to a different colored indicator, an animated indicator, a patterned indicator, a hashed indicator, etc.). At block 1016, additional information can be provided regarding the marked value and its associated rule. For example, based on user selection of a graphical indicator associated with a marked value, additional information regarding the initial pinned value, associated rule, VAP information regarding the pinned value, etc., can be displayed via the trading interface.

The example method 900 shown in FIG. 9 can be repeated for a number of marked values. The method 900 can continue to monitor market data and update graphic indicator(s) and/or other market data based on the ongoing monitoring.

Figure 10:
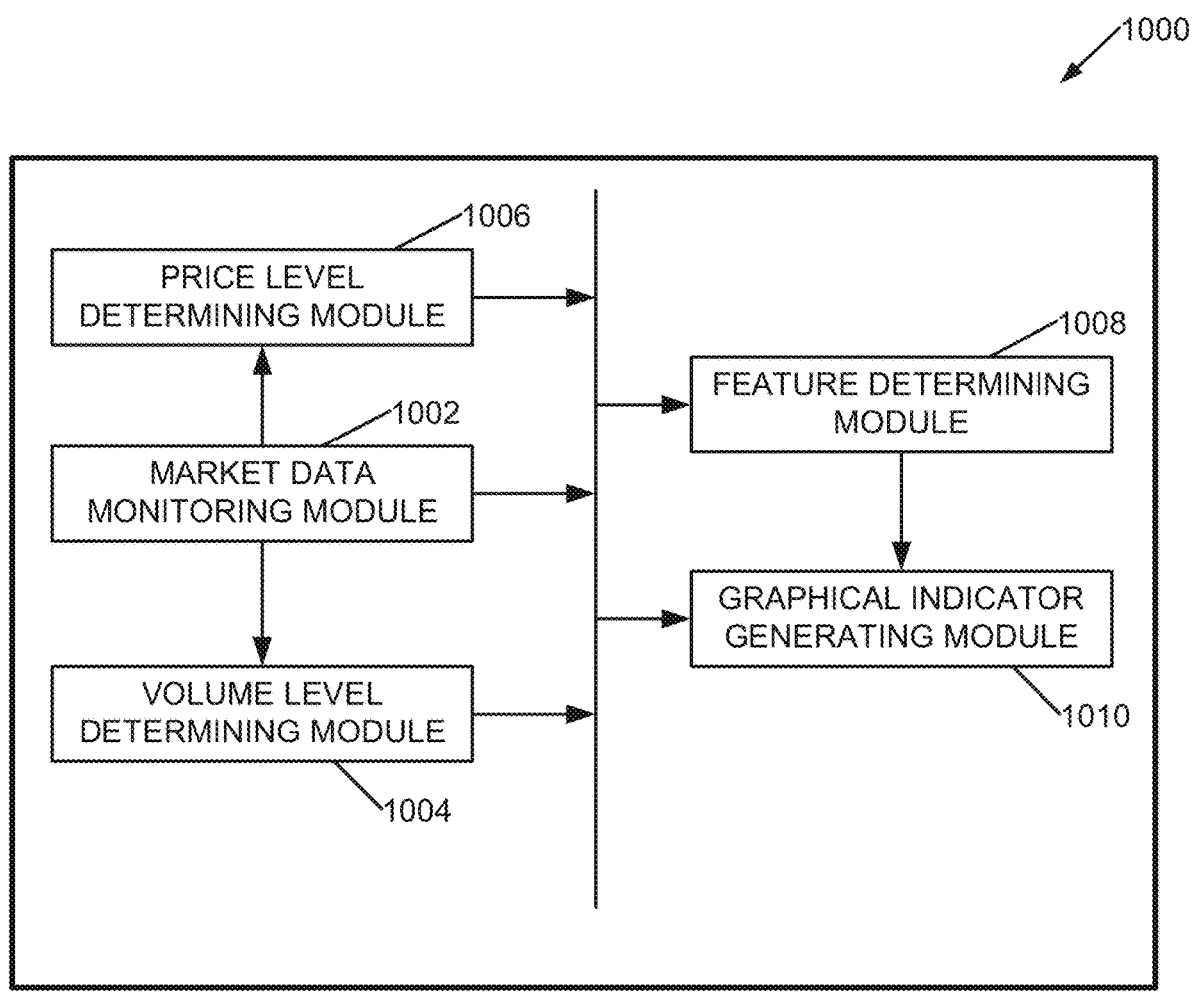
FIG. 10 is a block diagram depiction of an example trading interface module that may implement and/or execute the example method of FIG. 8 and/or the example method of FIG. 9.

FIG. 10 is a block diagram of an example trading interface module 1000 that may implement and/or execute the example method 800 of FIG. 8 and/or the example method 900 of FIG. 9. In some examples, the trading interface module 1000 is implemented as part of the example trading device 110, the example trading device 210, the example computing device 300 and/or any other device. The example trading interface module 1000 includes a market data monitoring module 1002, a volume level determining module 1004, a price level determining module 1006, a feature determining module 1008 and a graphical indicator generating module 1010.

The example trading interface module 1000 is in communication with an electronic exchange such as, for example, the electronic exchange 130 of FIG. 1, the electronic exchange 230a of FIG. 2, the electronic exchange 230n of FIG. 2 and/or any other electronic exchange. The example market data monitoring module 1002 receives, monitors, organizes and/or analyzes market data from the electronic exchange. For example, the example market data monitoring module 1002 monitors a volume of trades of a tradeable object and a price of the tradeable object. In some examples, the market data monitoring module 1002 determines a VAP, a rate of change and/or an amount of change of the price over a period of time or relative to one or more previously detected volumes and/or prices. In some examples, the market data monitoring module 1002 determines a direction of change of the price and/or volume. For example, the market data monitoring module 1002 determines if the volume is increasing, decreasing or substantially constant at a particular price.

In some examples, the volume level determining module 1004 determines a volume level of trades of the tradeable object based on the volume of trades. In some examples, the volume is a percentile of the volume of trades relative to previously detected volumes. In some examples, the volume level determining module 1004 calculates an absolute, relative, and/or median volume level based on volume(s) detected over a period of time via the market data monitoring module.

In some examples, the example price level determining module 1006 determines a price level or range over which a graphical indicator is to indicate a trend between the price and the volume of the tradeable object. In some examples, the price range is a given number of ticks from a current price of the tradeable object determined via the market data monitoring module 1002. Some examples do not include the example price level determining module 1006.

The example feature determining module 1008 determines which features and/or characteristics are to be included in the graphical indicator to indicate a trend between the volume and the price of the tradeable object. In some examples, the feature determining module 1008 determines one or more colors (e.g., in a color gradient), line patterns and/or fill patterns of the graphical indicator based on the volume levels of trades of the tradeable object. In some examples, the feature determining module 1008 determines a shape, size and/or orientation of the graphical indicator based on the price of the tradeable object. For example, the feature determining module 1008 may determine a length of the graphical indicator based on a rate and/or extent of change of the volume at a price. In some examples, the feature determining module 1008 determines an orientation of the graphical indicator based on the direction of change of the volume (e.g., an increase or a decrease in the volume).

The example graphical indicator generating module 1010 generates the graphical indicator based on the features and/or characteristics determined by the example feature determining module 1008. In some examples, the graphical indicator generating module 1010 generates the graphical indicator within a trading interface that is to be used to execute trades on the electronic exchange. In some examples, the trading interface includes market data (e.g., prices or price levels, volumes, ask quantities, bid quantities, and/or other information) related to the tradeable object.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A non-transitory computer readable medium having stored therein instructions executable by a processor, including instructions executable to:
   display a graphical user interface having a value axis with a plurality of sequential value levels determined according to market data for a tradeable object received from an electronic exchange;
   in response to receiving, via a user input device, a user selection of a selected value level of the value axis:
      display a flexible price-volume indicator aligned with the selected value level,
      generate a rule based on the received market data for the selected value level, and
      monitor, as the market activity is received, market activity with respect to market data received from the electronic exchange for the selected value level and the rule;
   update a display property for the flexible price-volume indicator, the display property being a quantity value determined from an analysis of the rule according to monitoring the market activity with respect to market data received from the electronic exchange for the selected value level and the rule; and
   display the flexible price-volume indicator in a differentiated state in response to a change in the market data.

2. The non-transitory computer readable medium of claim 1, further including instructions executable to:
   display a plurality of flexible price-volume indicators; and
   update each flexible price-volume indicator of the plurality of flexible price-volume indicators aligned with a respective selected value level in a value axis.

3. The non-transitory computer readable medium of claim 1, where the quantity value includes a volume of the tradeable object traded at the selected value level aligned with the flexible price-volume indicator.

4. The non-transitory computer readable medium of claim 1, where the quantity value includes a quantity value determined based on historical received market data.

5. The non-transitory computer readable medium of claim 1, where the quantity value includes a quantity value determined based on current received market data.

6. The non-transitory computer readable medium of claim 1, where the display property comprises a color.

7. The non-transitory computer readable medium of claim 1, where the display property comprises a pattern.

8. The non-transitory computer readable medium of claim 1, where the display property comprises a shading of the flexible price-volume indicator.

9. The non-transitory computer readable medium of claim 1, where the flexible price-volume indicator includes alphanumeric data and a graphical indicator.

10. The non-transitory computer readable medium of claim 1, where the differentiated state reflects a change in the market data corresponding to a market condition including an inside market.

11. The non-transitory computer readable medium of claim 1, where the differentiated state reflects a change in the market data corresponding to a market condition including a last traded price.

12. The non-transitory computer readable medium of claim 1, where the differentiated state reflects a change in the market data corresponding to a market condition including a largest traded quantity in a period of time.

13. The non-transitory computer readable medium of claim 1, where the differentiated state of the price-volume indicator includes a change in color of the price-volume indicator.

14. The non-transitory computer readable medium of claim 1, where the differentiated state of the price-volume indicator includes an addition of a pattern to the price-volume indicator.

15. The non-transitory computer readable medium of claim 1, where the differentiated state of the price-volume indicator includes an animation of the price-volume indicator.

16. The non-transitory computer readable medium of claim 1, where the differentiated state of the price-volume indicator includes an addition of an alphanumeric value to the price-volume indicator.

* * * * *